United States Patent
Jean

(10) Patent No.: US 7,315,793 B2
(45) Date of Patent: Jan. 1, 2008

(54) APPARATUS, SYSTEM AND METHODS FOR COLLECTING POSITION INFORMATION OVER A LARGE SURFACE USING ELECTRICAL FIELD SENSING DEVICES

(76) Inventor: Philippe Jean, Les Ateliers Numeriques Inc. 7658 Berrl, Montreal, Qc (CA) H2R 2G7

( * ) Notice: Subject to any disclaimer, the term of this patent is extended or adjusted under 35 U.S.C. 154(b) by 19 days.

(21) Appl. No.: 11/213,313

(22) Filed: Aug. 29, 2005

(65) Prior Publication Data
US 2006/0071674 A1    Apr. 6, 2006

(51) Int. Cl.
*G06F 19/00* (2006.01)
(52) U.S. Cl. .................................. 702/150; 702/127
(58) Field of Classification Search ............... 702/150, 702/152, 127; 709/FOR. 101; 348/208.14; 340/545.4
See application file for complete search history.

(56) References Cited
U.S. PATENT DOCUMENTS 6,515,586 B1 * 2/2003 Wymore ..................... 340/541
6,909,373 B2 * 6/2005 Power et al. ................ 340/665
6,982,649 B2 * 1/2006 Blum et al. ............. 340/815.4
2004/0183775 A1 * 9/2004 Bell ........................... 345/156

OTHER PUBLICATIONS de Silva, G.C.; Yamasaki, T.; Ishikawa, T.; Aizawa, K.; "Video handover for retrieval in a ubiquitous environment using floor sensor data" IEEE International Conference on Multimedia and Expo; Jul. 6-8, 2005; pp. 1-4.*
Papakostas, T; Lima, J; Lowe, M "A Large Area Force Sensor for Smart Skin Applications"; Proceeding of IEEE Sensors 2002; vol. 2; Jun. 12-14, 2002; pp. 1620-1624.*

* cited by examiner

*Primary Examiner*—John Barlow
*Assistant Examiner*—Douglas N Washburn
(74) *Attorney, Agent, or Firm*—Moetteli & Associés SàRL

(57) ABSTRACT

An apparatus, system and methods are provided for collecting information on the geographic positions of several moving or immobile objects simultaneously. A plurality of large scale printed circuits having charge transfer capacitance sensing properties are linked by a communication network in order to form a coherent sensing surface for the collection and reconnaissance of positioning and movement information. The positioning and movement information gathered can be used as input information by media control systems.

29 Claims, 9 Drawing Sheets

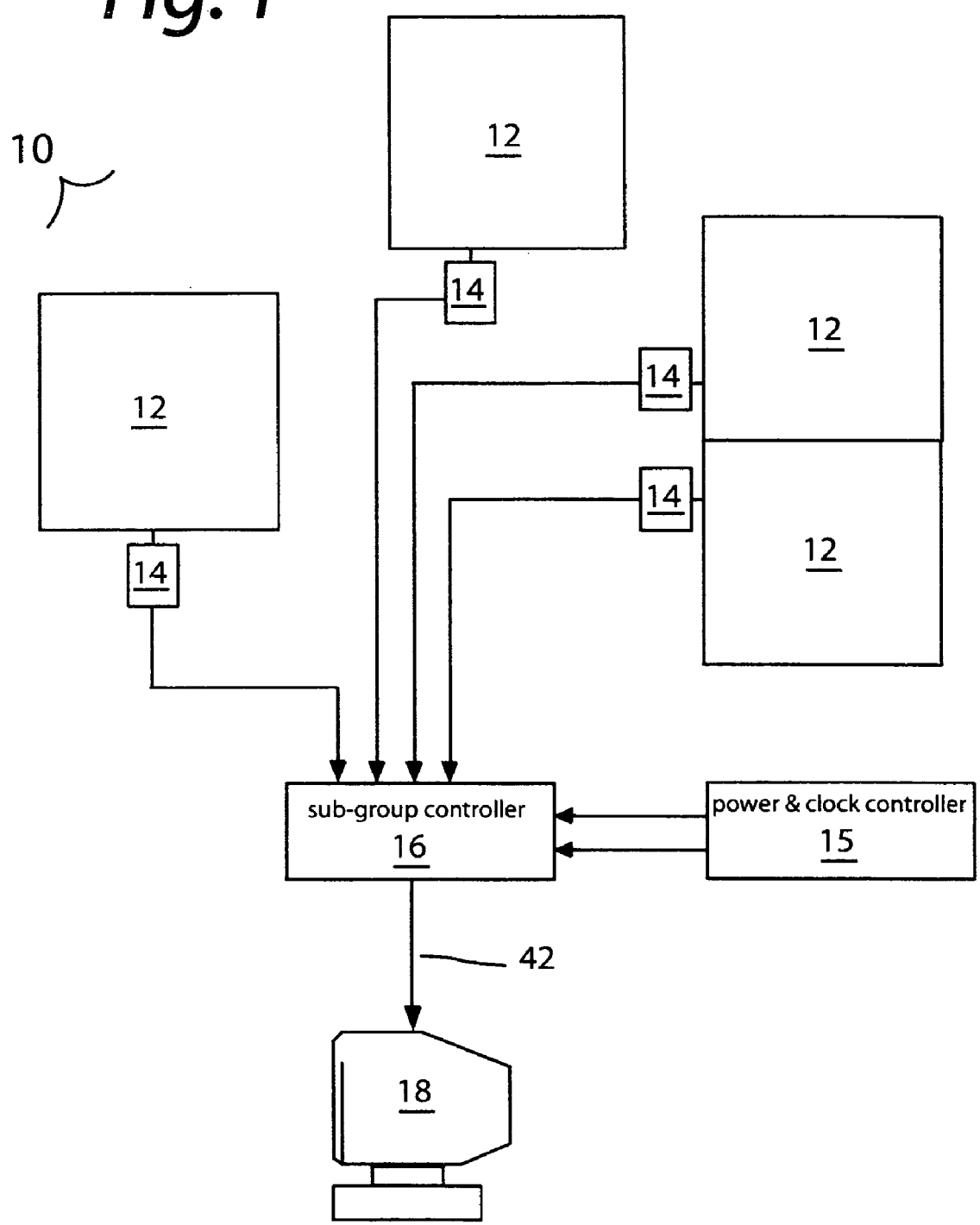

APPARATUS, SYSTEM AND METHODS FOR COLLECTING POSITION INFORMATION OVER A LARGE SURFACE USING ELECTRICAL FIELD SENSING DEVICES

FIELD OF THE INVENTION

The present invention relates generally to methods and apparatus for data input and for tracking objects, and in particular for input and tracking objects such as a person or a ball automatically for the purpose of, for example lighting up the vicinity of objects throughout their displacement over a surface.

BACKGROUND OF THE INVENTION

Related art shows several methods and apparatus used for collecting position information that can be used in conjunction with audio-visual systems to provide automatic follow-spot and other audio-visual applications in theatre stage, cinema and television studios, retail stores, exhibition spaces and locations of the like. Several such methods and apparatus are based on systems for the triangulation of sound waves or radio waves. These systems require that an emitter or, for other systems a receptor, be placed at all times on the object of which position information is collected. Calibration of these systems can be difficult, especially when the objects are positioned in the vicinity of reflective surfaces. Another set back or these systems is the limited number of objects that can be tracked simultaneously due to restrictions on available bandwidth for such systems.

Other methods and apparatus are based on the recognition of visual signals. U.S. Pat. No. 5,023,709 to Kita, the content of which is incorporated herein by reference thereto, discloses an automatic follow-up lighting system for automatically following an object having a mark that can reflect light in the coaxial direction when a light or infrared radiant is applied to the object. This system requires that each projector be coupled to an infrared TV camera and an electrically powered yoke or turntable, and that the object wears a mark that must remain visible at all times by a camera for the system to be effective, which is not always possible, particularly when setting elements are located on stage.

Related art shows several examples of methods for collecting position information using electrical field sensing devices, mostly in the field of capacitive touchpads which emulate a mouse or keyboard by tracking a single finger. These typically measure the capacitance of or between elongated wires which are laid out in row and columns (X-Y). A thin dielectric is interposed between the row and column layers. Presence of a finger perturbs the self or mutual capacitance for nearby electrodes. Since most of these technologies use projective row and columns sensors which integrate on one electrode the proximity of all objects in a particular row or column, they cannot uniquely determine the positions of two or more objects.

Multi-electrode capacitive sensors having a plurality of electrodes disposed about predetermined sensing area can determine the position of an object adjacent the area and, by making multiple measurements over a period of time, can determine the direction and speed of motion of the object.

Capacitive Sensors are readily commercially available such as the QT60000 FAMILY QMatrix TOUCH integrated circuit ("ICs") by QRG Ltd., that can be used for charge-transfer capacitive matrix keypanel sensing. The QT60000 family features charge-transfer ("QT") devices designed for touch sensing on 4, 16, 32, 48 or 64 keys when used in conjunction with a simple scanned, passive X-Y matrix. The Qmatrix IC employs transverse charge-transfer sensing in a matrix format that minimizes the number of required connections to the matrix. This product can project keypad keys through almost any dielectric up to thicknesses of 5 cm or more. Touch pads are made using simple 2-part interleaved electrodes of almost any conductor (e.g., copper, carbon, clear ITO, or screened silver on the rear of a panel). These shapes can be created using ordinary PCBs, flex circuits, or clear film. Key sizes, shapes and placement are almost entirely arbitrary and can be mixed within a panel. On 16-key devices and larger, the sensitivity of each key can be set individually using a serial communications port from a host microcontroller or computer. The devices are designed for appliances, kiosks, control panels, portable instruments, machine tools, or similar products that are subject to a variety of environmental influences or vandalism. [See http://www.qprox.com/products/]

U.S. Pat. No. 6,323,846 to Westerman, the content of which is incorporated herein by reference thereto, discloses a multi-touch surface for detecting a spatial arrangement of multiple touch devices than can be used for simultaneously tracking multiple contact points, as a manual data input for computer related applications replacing keyboard, mouse, keypad and stylus altogether. The multi-touch surface apparatus comprises a plurality of two-dimensional arrays of capacitance sensing devices arranged in groups. In this system, the sensing device is sensitive to changes in self-capacitance brought about by changes in proximity of a touch device to the sensing device. The sensing devices within a group have their output nodes connected together and share the same integrating capacitor to accumulate charge transferred during multiple consecutive switching of the series connected switching means; the same charge depletion switch, and the same voltage-to-voltage translation circuitry connected to the output node of the series-connected switching means which produces a voltage representative of the proximity of the touch device to the sensing device. The arrangement taught in U.S. Pat. No. 6,323,846 B1 does not permit a fully modular construction of the sensing devices, which modularity is required to cover large surfaces at reasonable manufacturing cost, and to enable an easy error-detection or default detection, and maintenance over a long useful life, in form of replacement of defaulting sections. This invention requires the use of a touch device or layer interacting with the sensing device, and does not concern applications where objects are directly in contact with the sensing surface.

What is needed, therefore, is a system, method or apparatus for collecting information on the geographic positions of several moving or immobile objects simultaneously, wherein such positioning and movement information can be used as input information by media control systems.

SUMMARY OF THE INVENTION

An apparatus, system and methods are provided for collecting information on the geographic positions of several moving or immobile objects simultaneously. A plurality of large scale printed circuits having charge transfer capacitance sensing property are linked by a communication network for the collection and reconnaissance of positioning and movement information over a large surface, wherein such positioning and movement information can be used as input information by media control systems.

The present invention is concerned with large scale printed circuits having charge transfer capacitance property, data transmission means, and logical systems for combining and filtering the digital data of several sensing circuits to form a coherent sensing image for the collection and reconnaissance of positioning and movement information. The present invention is also concerned by the methods by which the large sensing surface can be assembled, implemented and installed.

A principal feature and preferred embodiment of the present invention provides a plurality of not-necessarily adjacent sensing tiles forming a coherent sensing surface of large format for the collection and communication of position and movement information, wherein each sensing tile having at least two conductor elements connecting to a charge transfer capacitance measurement circuit, voltage measurement circuitry to convert sensor voltage data to a sensor digital code, and circuitry for communicating the sensor digital code to another electronic device. Each sensing tile is sensitive to changes in self-capacitance brought about by changes in proximity or contact with an object to the sensing tile. Each sensing tile comprises a tile controller for acquiring the sensor digital code from the capacitance measurement circuit and communicating the sensor digital code to a sub-group controller that connects a plurality of sensing tiles by their respective tile controller. The sub-group controllers are responsible for distributing electrical power to the sensing tiles, synchronizing the output signals from all sensing tiles connected herewith, routing command traffic, and collecting, processing and publishing a sensing image representing the real-time position of all objects in proximity to or contact with the sensing tiles. This method, apparatus and system, to be useful, must provide a means allowing the construction of a large sensing surface without compromising sensing resolution. The sensor digital data provided by the sensing tiles is interpreted to avoid conflict, maximize noise/resolution ratio and provide a unique sensing image, i.e. providing a coherent sensing surface, that is not dependent from the arrangement of the sensing tile, which can be arranged adjacent or not to one other.

In a particular preferred embodiment, the invention comprises a plurality of sub-group controllers connected to a group controller which routes command traffic and also collect, process and publish the sensing image generated by all the sub-group controllers connected thereof. A group controller is only required when a multiple sub-group configuration is used. The group controller publishes to the central computer the position information in view of all the sensing tiles connected thereof, to form a coherent sensing surface.

In another preferred embodiment of the invention, the sensing tiles can be conveniently integrated to a stage floor, a wall, a piece of furniture or other surfaces. The sensing tiles typically carries two substrate surfaces on which conductor elements or printed circuits are affixed or printed for example by lithographic process; the substrate is made of thin film or polymer material such as acrylic. The substrate can be arranged underneath or on top of a floor without need for dedicated insulation material. The sensing tiles can be arranged adjacent to one other over a surface, or be arranged at not-adjacent or even distant location from one other.

Accordingly, the purpose of this invention is to overcome the limitations and reduce many of the problems associated with object tracking and data input systems of prior art.

In an object of the invention, an apparatus, system and method is provided for determining the geographic position of several moving or immobile objects simultaneously, as inputs to media control systems.

It is an object of the present invention to provide a data input method for use by a media control system such as a lighting control desk or a video image controller or a digital imagery generator, by which the movement of a plurality of objects over a surface can be used as input information for media control and the creation of digital imagery. This object is achieved by combining the sensor digital signal originating from at least two not-necessarily adjacent sensing tiles, into a coherent sensing image signal that provides a real-time rendition of the geographic position and other attributes such as speed and direction of displacement and acceleration of the objects in proximity or in contact with the sensing surface.

It is another object of some embodiment of the invention to provide capacitance sensing of a plurality of objects, simultaneously over a large surface such as a theatre stage. This is typically achieved by implementing a system with a modular construction, wherein sensing tiles are constructed as independent sensing units for charge transfer sensing means.

It is another object of the invention to provide a means for tracking a large number of objects, typically in excess of twelve, simultaneously on a surface such as a theatre stage. Accordingly, the present invention addresses the need to increase the number of objects that can be tracked simultaneously over a large surface. A multi sub-controller configuration can typically feature up to one hundred sensing tiles and more for providing a coherent sensing surface area of up to 225 sq meter and more. Such sensing surface can capture the position of typically up to thirty persons, at a resolution per point in the range of ten sq cm.

It is yet another object of the invention to provide a reliable tracking system over a large surface such as a theatre stage that necessitates minimal set-up time. This object is achieved by the use of a capacitance sensing surface, which avoids the need for the persons or objects to either wear a transmitter, an emitter, or a visible mark. The sensing surface is being embedded in a floor or on other surfaces, in whole or in part, and its operation is not affected by changes in setting or replacement of objects.

It is another object of the invention to provide a tracking system over a large surface such as a theatre stage that provides a long useful life and that necessitate reduced maintenance. Maintenance of the sensing surface is limited to the replacement of faulting individual sensing tiles, tile controllers, sub-group or group controller or cabling, without affecting the functioning of other elements of the sensing surface. The use of low power consumption capacitance sensing tiles and the use of inert and robust substrate for the construction of the sensing tiles limit component's wear and tear at minimum.

In an advantage, the invention is of particular utility when used to collect position and movement information of persons and objects over a large surface such as a theatre stage, cinema and television studios, retail stores, exhibition spaces and locations of the like.

Other objects, advantages and features of the present invention will become more apparent upon reading the following non restrictive description of preferred embodiments thereof, given by way of example only with reference to the accompanying drawings.

BRIEF DESCRIPTION OF THE DRAWINGS

FIG. 1 is a schematic view of a sensing surface system of the present invention.

DESCRIPTION OF THE PREFERRED EMBODIMENT

Figure 2A:
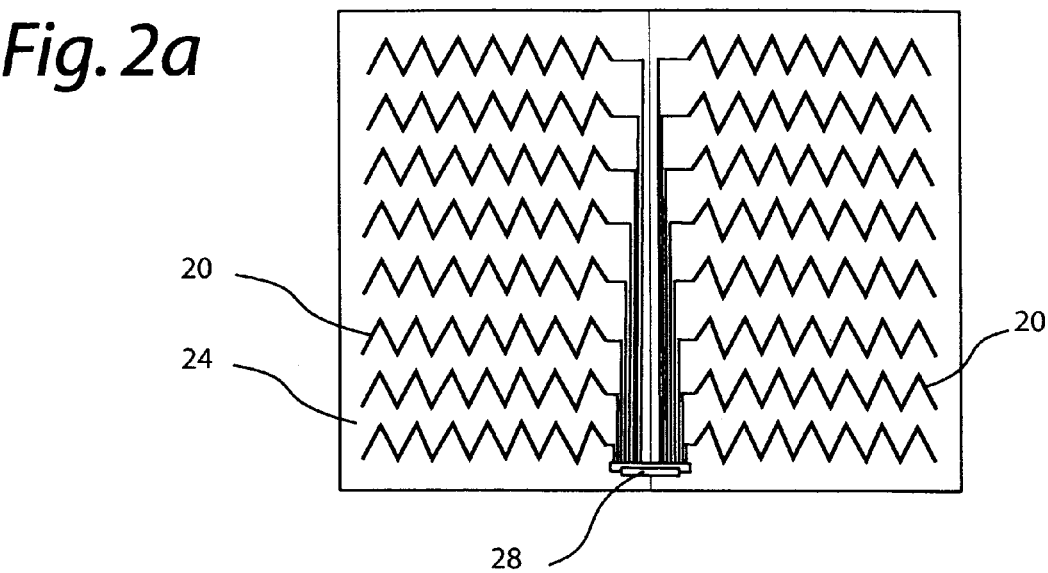
FIGS. 2a and 2b are respectively top view of X and Y sensors and their substrate and a connector.

Referring to the Figures, wherein like numerals indicate like or corresponding parts throughout the several views, a system for collecting information on the geographic position of several objects simultaneously over a large surface using electrical field sensing devices is generally indicated at 10 ("sensing surface"). The sensing surface system 10 and preferred embodiment of the present invention illustrated at FIG. 1 comprises a plurality of not-necessarily adjacent sensing tiles 12 that are sensitive to changes in self-capacitance brought about by changes in proximity or contact with an object to the sensing tile 12, tile controllers 14, a power and clock controller 15 and a sub-group controller 16 that connects a sub-group of several sensing tiles 12 by their respective tile controller 14 in order to form a coherent sensing surface for the collection and reconnaissance of positioning and movement information, and a central computer or client system 18 for using the sensing image provided by the sensing surface 10, for example by interfacing positioning and movement information with external systems.

Figure 2B:
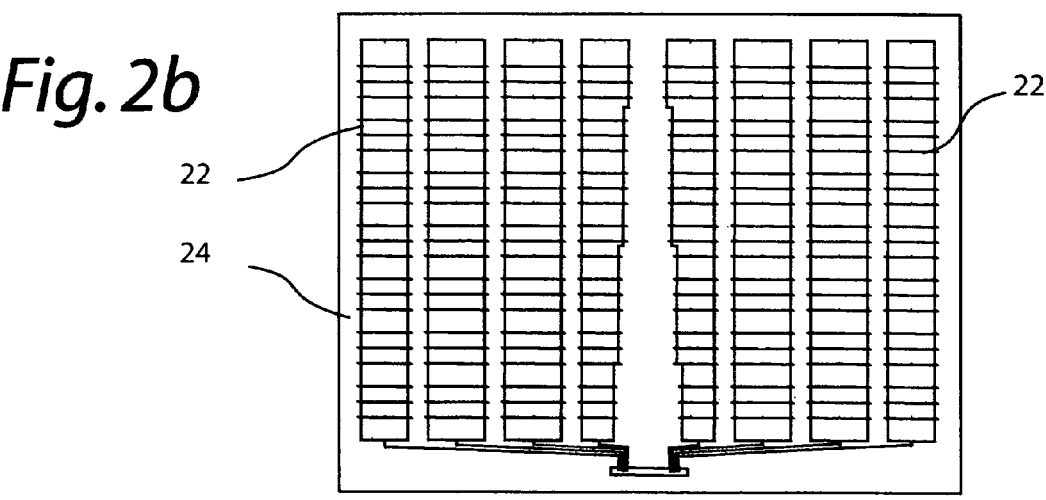
Figure 2C:
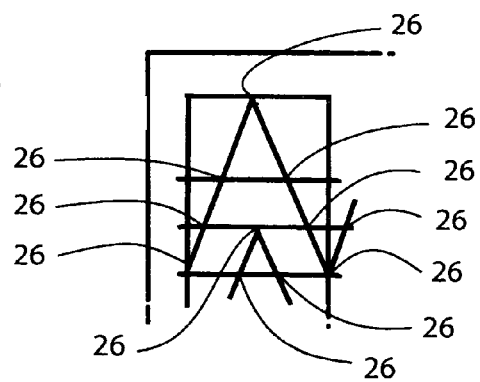
FIG. 2c is a partially cut-away top view of a sensing tile showing sensing points.

In a preferred embodiment of the present invention illustrated at FIGS. 2a, 2b and 2c, each sensing tile 12 is composed of relatively thin material for a relatively large surface area, typically between 0.75 and 1.5 square meter for a depth of two to four millimeters. Each sensing tile 12 comprises two sensors 20, 22 (X and Y sensors) composed of conducting material such as copper, carbon, clear ITO, or screened silver, created using ordinary PCBs, flex circuits, or clear film and affixed or printed for example by lithographic process on the surface of a rigid or flexible substrate 24 composed of dielectric material such as thin polymer, plastic, wood, acrylic or rubber material. Each sensor 20, 22 is composed of at least one but preferably of eight, sixteen, thirty-two or sixty-four two-dimensional conductor elements, which are shaped and designed to provide a fair balance between signal level (resolution vs. noise) and stability. One substrate 24 can provide, at least in the case but nor limited to acrylic material, a sufficient dielectric layer between the sensors 20, 22 for the electrical charges to be transferred to the conductor, and changes in charges, i.e. capacitance be measured. Proximity of objects can be detected through dielectric such as wood, stone, plastic, ceramic, up to a maximal distance of 10 cm and more from the sensing tile 12. Higher sensing height can be reached by using less aggressive software filter, provided sufficient shielding isolates the sensing tiles 12 from environmental conditions. Sensing points 26 are provided on each location where a portion of sensor 20 overlaps or crosses a portion of sensor 22, as shown in FIG. 2c. Sensing points 26 acts as resistances, on which electrical charge can be measured, and on which changes in capacitance can be induced by proximity or contact of an object. Conductor elements 20, 22 can be optionally shielded. The same number of intersection points 26 can be embedded in sensing tiles 12 of different size allowing sensing surfaces with various resolutions. The sensing surface 10 provides sufficient resolution to recognize the external ridge of a hand or a foot, up to the tip of a shoe. Resolution can be enhanced by placing a conductor element on the surface or the structure of an object, such as metal foil placed inside a shoe sole. Optionally, sensing tiles 12 having variable density of sensing points 26 can be arranged from one area of the sensing tile 12 to another providing variable resolution within a single sensing tile 12. A connector 28 affixed on the surface of one substrate 24 connects sensor 20 and 22 and provides an interface to tile controller 14, for example using a bus connector.

In a preferred embodiment of the present invention, a modular construction of the sensing surface 10 is provided, wherein sensing tiles 12 are constructed as independent sensing units for charge transfer sensing means, and can be arranged adjacent to one other over a surface, or be arranged at not-adjacent or even at distant location from one other. Sensing tiles 12 can be constructed in a wide variety of shapes and forms to adapt to particular furniture or objects, for example a chair or a stairway, and can be cut and arranged in various fashion.

Figure 3:
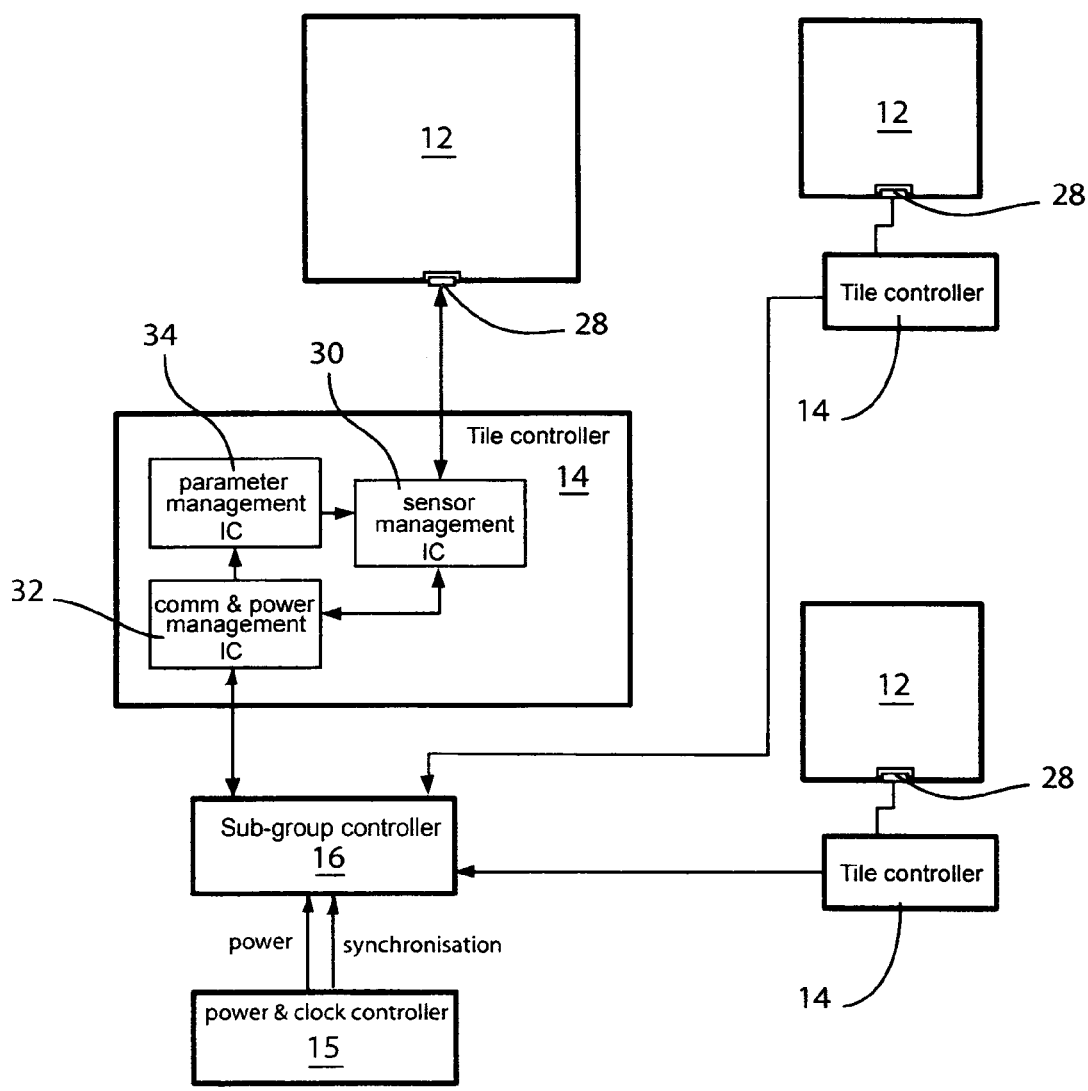
FIG. 3 is a schematic view of a tile controller and other elements of the sensing surface system.

In a preferred embodiment illustrated in FIG. 3, a tile controller 14 is responsible for acquiring the sensor digital data from the sensing tile 12 and for communicating the sensor digital data to the sub-controller 16. Tile controller 14 comprises a sensor management IC 30 responsible for charge transfer capacitance measurement and voltage measurement and for the conversion of sensor voltage data to a sensor digital code, a communication and power management IC 32 responsible for distributing electrical current to the sensors 20, 22 in synchronization with similar signals distributed to other sensing tiles 12 and for communicating the sensor digital code to another electronic device, and a parameter management IC 34 responsible for parameter modification and signal persistence. Sensor management IC 30 provides a mean for acquiring and measuring absolute or relative voltage value at each sensing points 26 of a sensing tile 12, and preferably comprises a capacitive sensor such as a Qmatrix TOUCH integrated circuit by QRG Ltd, an Analog-To-Digital (ATD) converter and digital logic means such as random logic, a state machine, or a microprocessor and a control means, i.e. a circuit or system capable of generating digital control signals. The parameter management IC 34 controls the acquisition rate, preferably within a sampling rate of 20 to 60 times per second. The power and clock controller 15 is responsible for distributing electrical power to the sub-group controller 16 and for providing a synchronization signal through sub-group controller 16 that is used by tile controllers 14 for acquiring sensing digital data from their respective sensing tile 12 simultaneously and at a similar acquisition rate. The sub-group controller 16 is responsible for routing command traffic and for collecting, processing and publishing a sensing image.

Figure 4:
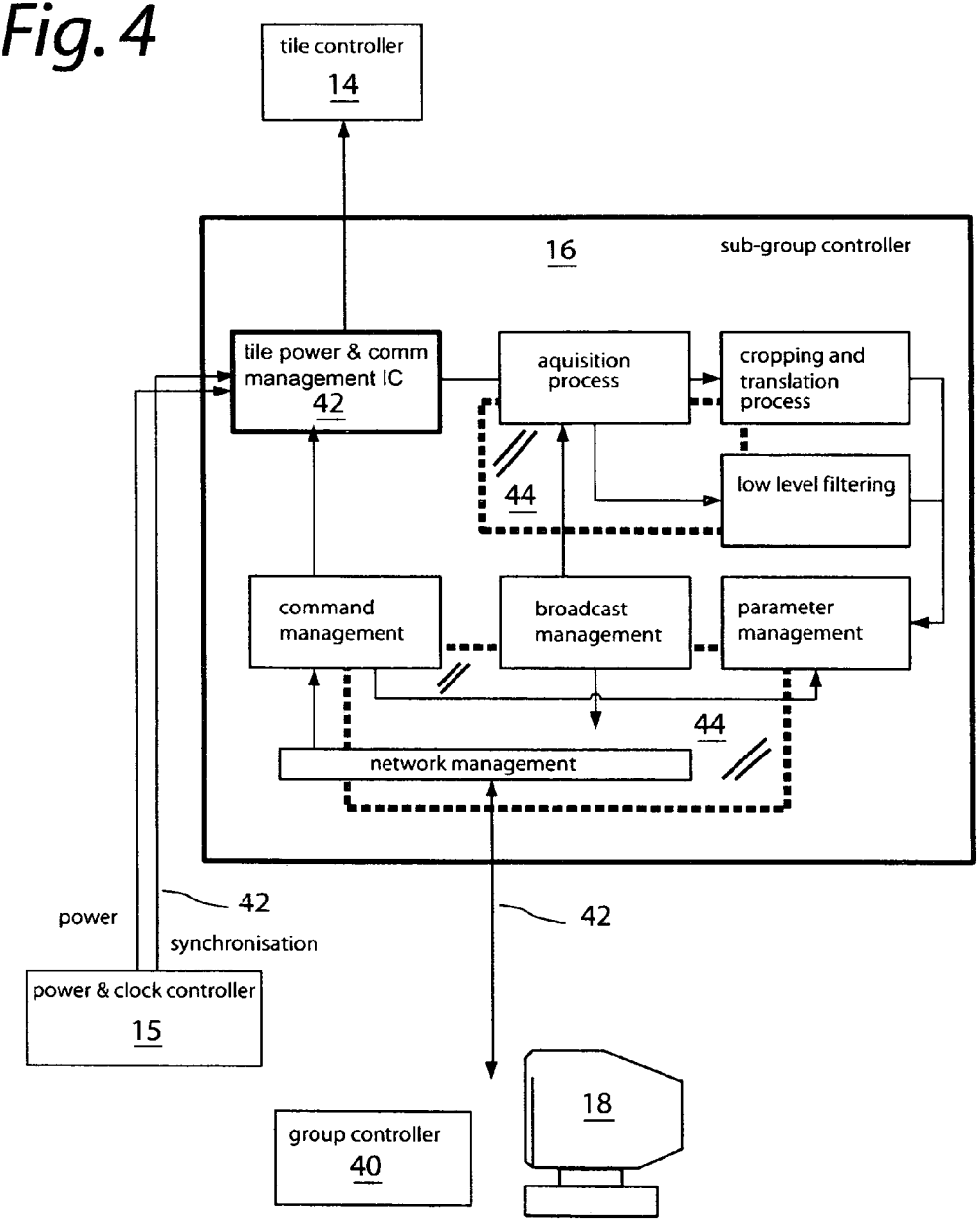
FIG. 4 is a schematic view of a sub-group controller and data flow diagram of the operation performed by the respective integrated circuits.

In a preferred embodiment of the present invention illustrated in FIG. 4, the sensing image, i.e. the data representing the real-time position of all objects in proximity to or contact with sensing tiles 12 is formed and composed successively at the sub-group controller 16 level, and client system 18 level in order to provide a coherent and unique sensing image for the sensing surface 10. Sub-group controllers 16 comprise digital logic means 44 such as microprocessors able to read and execute instructions, which are responsible for operations such as the acquisition process, the cropping and translation process, low level filtering, parameter management, broadcast management, command management operations, and network management. The acquisition process refers to the reading of the sensing digital data provided by tile controllers 14. Since sensing tiles 12 can be a cut and arranged in various fashion, a cropping operation is required to remove from the sensing image any unused portion of a sensing tile 12. The translation process places the sensing digital data pertaining to a sensing tile 12, or the sub-group partial sensing image at its proper position within the global sensing image for the sensing surface 10. Low level filtering process means applying filters to the acquired sensing digital data to reduce noise and to enhance the sensing image. A various number of filters (ex: Average, Neighbor, Median, Peak, Min/Max) can be used at different stage of the sensing image composition, at the sub-controller 16 level and at the client system 18 level. The parameter management refers to the modification and control of parameters and persistence of the sensing digital data at the tile controller 14 and/or sub-controller level 16. Broadcast management and network management processes are responsible for publishing and transmitting the sub-group sensing image to the client system 18. The command management process controls the flow of instructions sent to or retrieves from a tile controller 14, such as configuration commands. The network management provides a means for the sub-group controllers 16 to communicate data to the group Client System 18, using generic data transmission means and communication protocol, such as TCP/IP and serial port communication, using cables 42 or wireless data transmission means (not shown). Sub-group controller 16 can interface to client system 18 using a PCI card, or a serial port solution such as serial/Ethernet box. Sensor digital data is interpreted at each step of the composition of a sensing image in order to avoid conflict, maximize noise/resolution ratio and provide a coherent and unique sensing image that is not dependent from the arrangement or location of the sensing tiles 12. There is a natural tendency for the sensing tiles to interfere among each other when used concurrently, especially when arranged adjacent to one other. Software based logical computing processes (filters) are used to reduce noise and to enhance the sensing image at the sub-group controller 16 level or central computer 18 level. The filtering processes minimize interference, using functions such as Pacing, Post-acquisition filtering, etc., and enhanced the sensor digital data at different stage of the sensing image composition, using functions such as Average, Neighbor, Median, Peak, Min/Max, etc.

Figure 5:
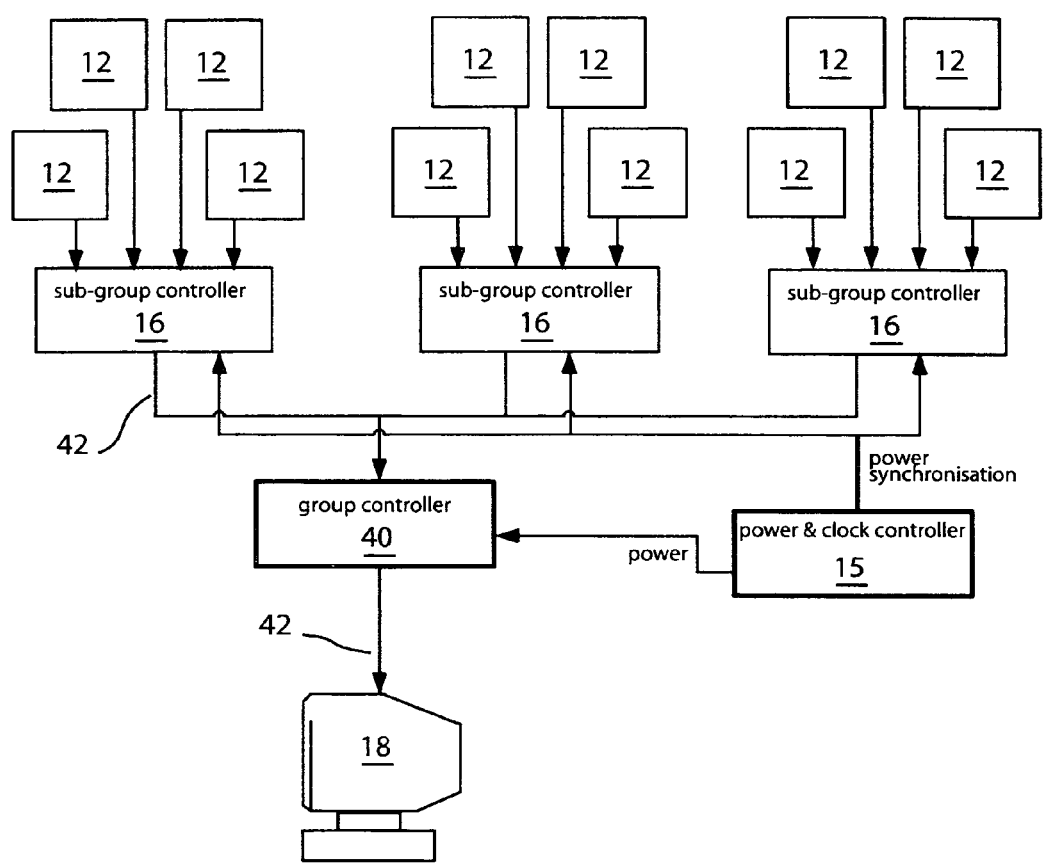
FIG. 5 is a schematic view of a sensing surface in multiple sub-groups configuration.
Figure 6:
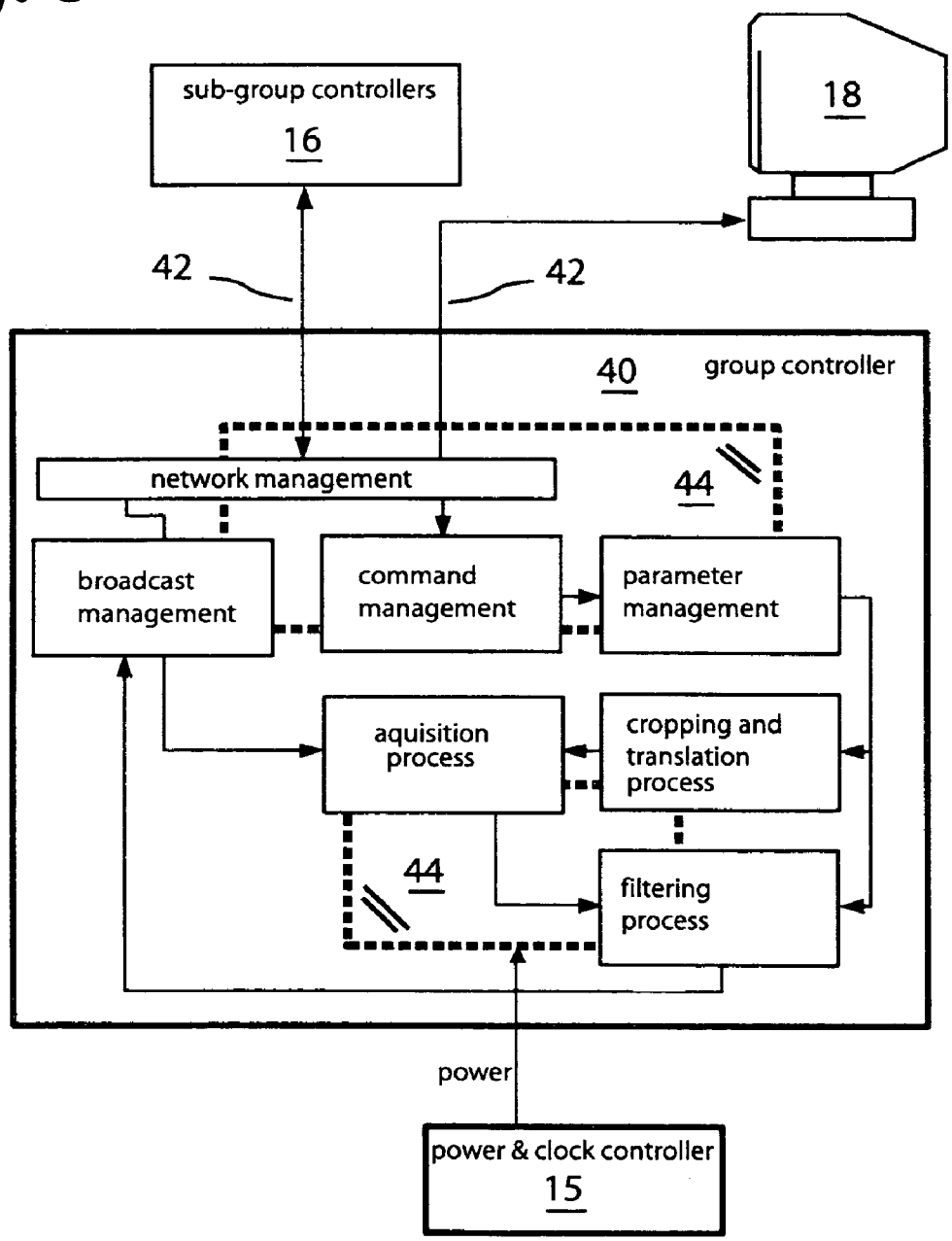
FIG. 6 is a schematic view of a group controller and data flow diagram of the operation performed by the respective integrated circuits.

Alternatively, a preferred embodiment of the present invention provides a multiple sub-controllers configuration illustrated in FIGS. 5, 6, where the sensing image is formed successively at the sub-controller 16 level and at the group controller 40 level, which publishes for client system 18 the sensing image in view of all the sensing tiles 12 connected thereto to form a coherent sensing surface. A group controller 40 is only required when a multiple sub-group configuration is used. The group controller 40 routes command traffic and also collects, processes and publishes the sensing image generated by all the sub-group controllers connected thereof. Group controller 40 comprises digital logic means 44 equivalent in functionality to digital logic means 44 of sub-group controllers 16, such as microprocessors able to read and execute instructions, which are responsible for operations such as the acquisition process, the cropping and translation process, low level filtering, parameter management, broadcast management, command management operations, and network management. Software based logical computing processes (filters) are used to reduce noise and to enhance the sensing image at the sub-group controller 16 level and at the group controller 40. In multi-sub group configuration, the power and clock controller 15 is responsible for distributing electrical power to the group controller 40 and to the sub-group controller 16, and for providing a synchronization signal through sub-group controller 16. The network management provides a means for the group controllers 40 to communicate data to the group client System 18, using generic data transmission means and communication protocol, such as TCP/IP and serial port communication, using cables 42 or wireless data transmission means (not shown).

Figure 7:
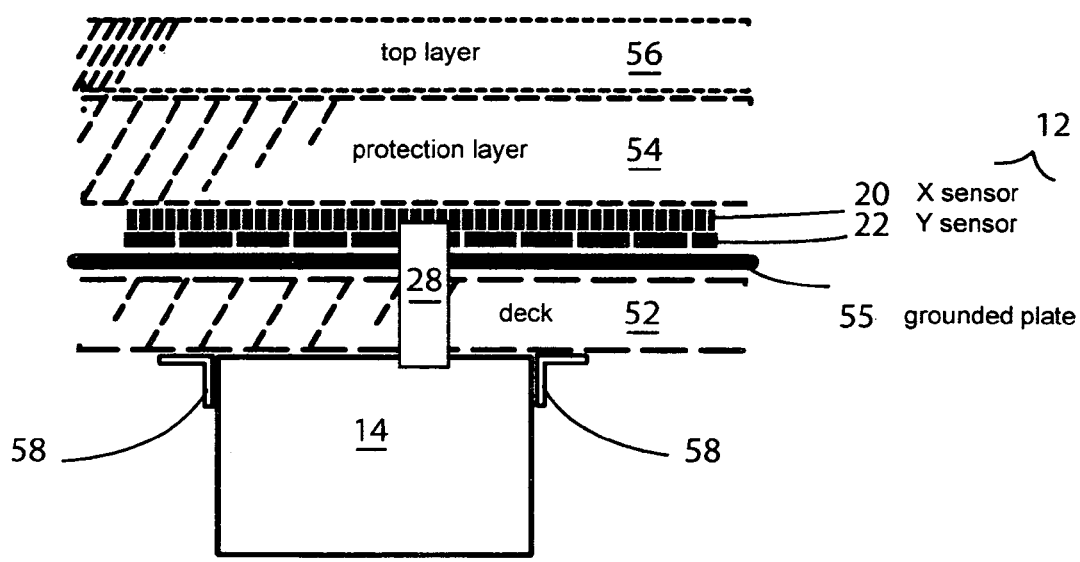
FIG. 7 is a partial cross-sectional view of a sensing tile, tile controller and other surface layers.

It is another object of the invention to provide capacitance sensing of a plurality of objects, simultaneously over a large surface such as a theatre stage, cinema and television studios, retail stores, exhibition spaces and the locations of the like, including private dwelling, public outdoor spaces such as gardens or public indoor spaces such as airports and train stations. As shown in FIG. 7, the sensing tiles 12 can be conveniently integrated to a stage floor, and can similarly be integrated to a wall or other surfaces or in mobile objects such as a piece of furniture, a chart map, or a board game. The sensing tile 12 may be arranged underneath or on top of a floor or deck 52 without need for dedicated insulation material, expect in places where the sensing tiles 12 are likely to suffer regular pressure and shocks. In this case, a protective layer 54 composed of insulating material such as foam, polymer or rubber is disposed immediately on top of the sensing tile 12, and covered by a rigid top payer 56 for ensuring durability and facilitating displacement of persons and objects. A grounded plate 55 composed of conducting material such as thin metal sheet is optionally arranged between the deck 52 and the sensing tiles 12 in order to shield the sensing tiles 12 and provide immunity to vibrations and electrostatic interferences originating from mechanical or human activity tacking place underneath or in contact with the deck 60. Protective layer 54 and/or top layer 56 allow the sensing tiles 12 to withstand pressure caused by performers running and walking, and impact caused by performers jumping. Shielding extends to all sensing points 26 to avoid unexpected signal noise. Shielding helps to collect accurate position sensing in demanding contexts where for example set elements such as a moving deck 52, "spears", stairways, lifts or elevators embedded or affixed to or piercing through the stage, are in operation. The tile controller 14 may be affixed immediately underneath or preferably in contact with the deck 60, using standard brackets 58 or an equivalent fastening device. Connector 28 connects the sensing tiles 12 to the tile controller 14 through hollow sections (not shown) pierced through the deck 60. In case of theatre stage and surface of the like, the sensing tiles 12 may be inserted in between existing floor surface layers in order to reduce weight and width of the system. Power and communications cabling (not shown) between the sensing tiles 12, tile controllers 14 and sub-group controllers 16 will be arranged within or underneath layers of deck 52.

Sensing tiles 12 are not sensitive to orientation and can be arranged at any angle pertaining to deck 52 or object, i.e. horizontally, vertically, etc.

Figure 8:
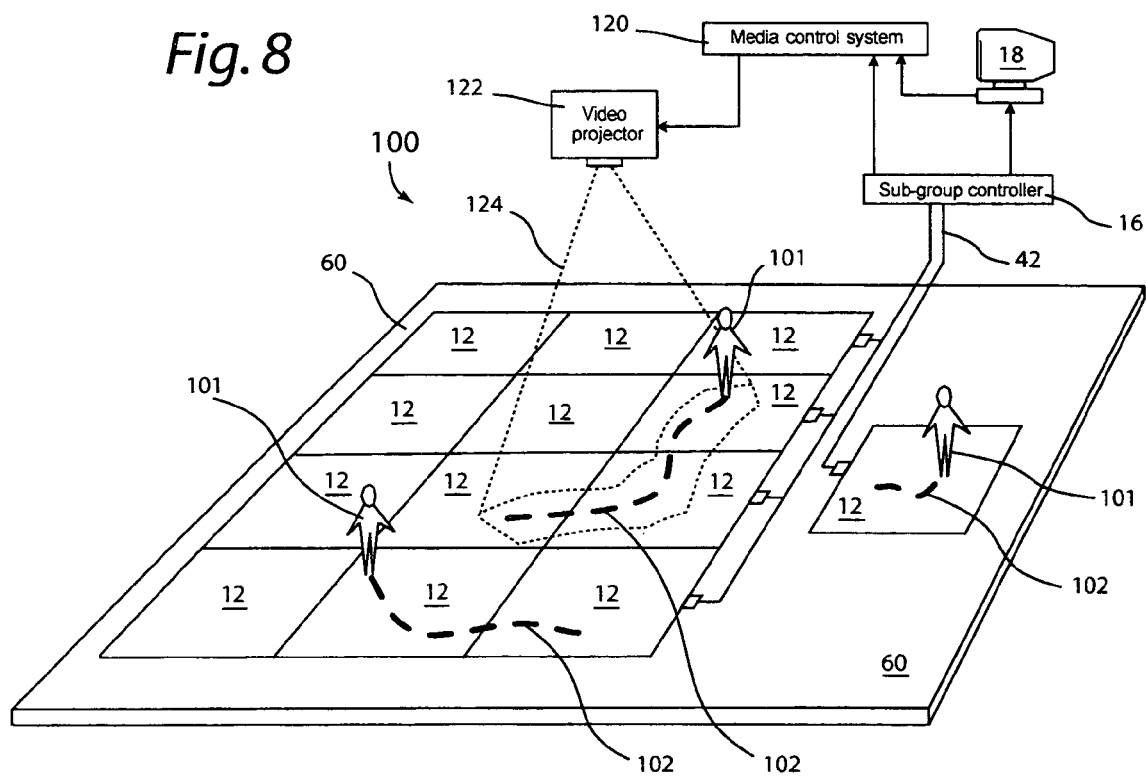
FIG. 8 is an elevation schematic view of the sensing surface combined with a video projection system to provide tracking capabilities.

In another embodiment of the present invention illustrated in FIG. 8, a tracking system 100 provides a mean for detecting the position and movements of a large number of objects 101, typically in excess of twelve, simultaneously on a surface such as a theatre stage or deck 60. A sensing surface 10 in multi sub-controller configuration can typically feature up to one hundred sensing tiles 12 and more for providing a coherent sensing surface area of up to 225 sq meter and more. Such sensing surface is capable of capturing the position of typically up to thirty persons, at a resolution per point in the range of ten sq cm, equivalent to the average distance in between two adjacent sensing points 26. Sensor digital signal from the sensing surface is optionally refreshed several times a second, allowing positions to be captured accurately at maximal displacement speed over the surface of thirty km/h and more for several simultaneous objects. Each sensing tile 12 is sensitive to changes in self-capacitance brought about by changes in proximity or contact with an object or person 101 to the sensing tile. System collects information on the geographic position of objects 101 at all time, and can optionally retain in memory position information according to time, in order to detect and interpret movement paths 102. Tracking system 100 can therefore determine positioning and movement attributes such as displacement speed, direction of displacement, acceleration, etc. Client system 18 provides a real time sensing image comprising all position and movement information that can be configured and translate for use by a media control system 120 such as a video projector controller, lighting desk, automated lighting desk, digital imagery generator, etc. Sensing image can be used for example to track the gesture of individuals and the movement of certain objects, becoming a large scale input device for numerous applications. In a typical application of the tracking system 100, the media control system uses the sensing image as input data for the processing of control commands addressed to a video projector 122 or other media such as an automated lighting projector, a 3D sound system, etc. Control commands can for example specify that the video projector 122 images light with a certain color or intensity along displacement paths 102, while imaging light with different hue, saturation and intensity or no light at all on the surface of the deck 60 that do not feature displacement paths 102. Media control system 120, capable of real-time video editing or real time rendering of computer-generated graphics, can use the sensing image provided by client system 18 in unlimited ways in order to affect the audio-visual characteristics and features of the location hosting the tracking system 100 or any other remote location, using media such as video projectors, sound, lighting, mechanical devices, smoke, etc.

Figure 9:
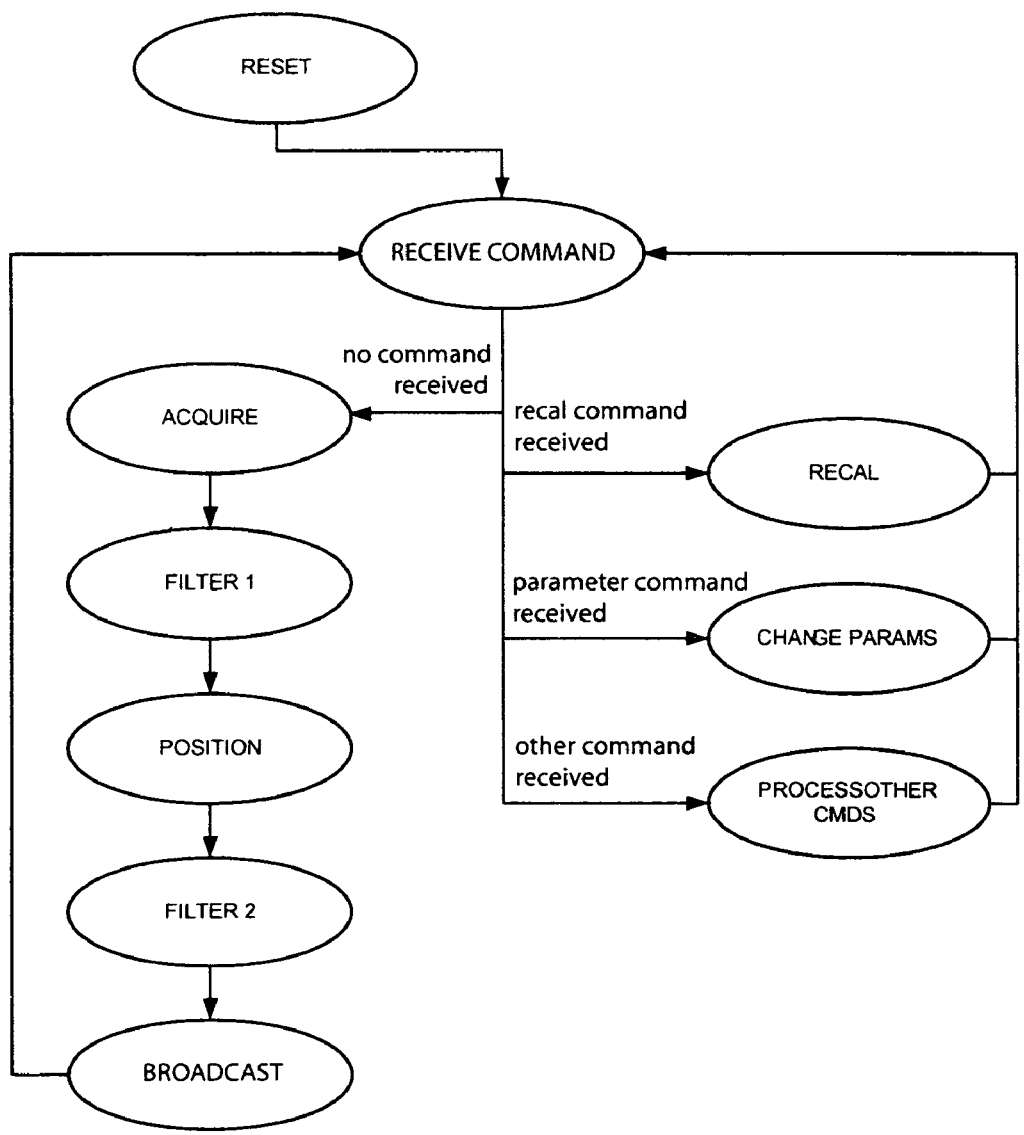
FIG. 9 is a data flow diagram of operation states during recalibration of the sensing surface system.

Once the sensing surface 10 is installed on deck 60, the tracking system 100 does not require any set-up time, except for switching on the power and clock manager 15 and client system 18. The use of a capacitance sensing avoids the need for the persons or objects 101 to either wear a transmitter, an emitter, or a visible mark. The sensing surface is being embedded in a floor or on other surfaces, in whole or in part, and its operation is not affected by changes in setting or replacement of objects on the surface of the deck 60. The arrangement of the sensing tiles 12 shown in FIG. 7 provides a long useful life and that necessitates a reduced maintenance of the sensing surface, typically limited to the replacement of faulting individual sensing tiles 12, tile controllers 14, subgroup 16 or group controller 40 or cabling 42, without affecting the functioning of other elements of the sensing surface 10. The use of low power consumption capacitance sensing tiles and the use of inert and robust substrate 24 for the construction of the sensing tiles 12 limits component's wear and tear at minimum Tile controller 14 has the ability to run for a long period of time and the ability to recalibrate properly after any interruption. Any sensing tile 12 can be turned off or disabled before or during operation of the sensing surface 10, without detrimentally affecting the functioning of remaining sensing tiles 12. Recalibration is possible at various levels: single sensing point 26, single sensing tile 12, group of sensing tiles 12, points within group of sensing tiles, or the whole sensing surface. Recalibration of the whole sensing surface 10 from the client system 18 is fast, typically taking less than two seconds regardless of the resolution, speed of acquisition or number of sub-controllers 16. Other values such as resolution and sensitivity of the sensor digital signal can be modified at all time from the client system 18. FIG. 9 illustrates the different operation states of the sensing surface system 10. The reset function is called by the client system 18. When no command is specified, the sub-group controller 16 acquires sensing digital data tile controller 14, filters the data, composes a sensing image, re-filters the sensing image to enhance signal quality and broadcasts to the client system. In a multi sub-group configuration the group controller 40 typically performs the second filtering and broadcast operations. A recall command from the client system 18 overrides the acquisition operation at any moment, for example for allowing a change of acquisition parameters, a partial or complete recalibration of the system or any other command.

Multiple variations and modifications are possible in the embodiments of the invention described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A system for collecting information on the geographic position of an object, comprising:

at least two not-necessarily adjacent sensing tiles sensitive to changes in self-capacitance brought about by changes in the geographic position of the object relative to the sensing tile, the sensing tile comprising at least two conductor elements, a sensor for measuring the capacitance to ground of the conductor element, a charge transfer capacitance measurement circuit adapted for measuring electrical charge voltage and for converting the sensor voltage data into position information, and data communication means;

a sub-group controller for distributing electrical power to the sensing tiles, for synchronizing the position information signal received from all sensing tiles connected therewith and for routing command traffic, comprising logic circuit elements for processing logical computing processes, and data communication means;

a communication system for remotely transmitting the position information signal from the sensing tiles to the sub-group controller, and from the sub-group controller to the central controller, and for remotely controlling the capacitance measurement circuit and the sub-group controller; and at least two sensors composed of conducting material;

a tile controller connected to each sensing tile by a connector adapted for acquiring the sensor digital data from the sensing tile and for communicating the sensor digital data to the sub-controller, comprising a sensor management module adapted for charge transfer capacitance measurement and voltage measurement and for the conversion of sensor voltage data to a sensor digital code and a communication and power management module adapted for distributing electrical current to the sensors and for communicating the sensor digital code;

a power and clock controller adapted for distributing electrical power to the sub-group controller and for providing a synchronization signal through sub-group controller that is used by tile controllers for acquiring sensing digital data from the sensing tiles simultaneously and at a similar acquisition rate;

a sub-group controller connecting a sub-group of at least two sensing tiles by their respective tile controller in order to form a coherent sensing image for the collection and reconnaissance of positioning and movement information, adapted for routing command traffic and for collecting, processing and publishing a sensing image representing a real-time position of objects in proximity to or contact with the sensing tiles; and a central controller for receiving the sensing image provided by the sensing surface and for controlling the sub-group controller and the capacitance measurement circuits wherein the sensing tile provide a plurality of sensing points acting as a resistance on each location where a portion of a sensor overlaps a portion of another sensor, and on which changes in capacitance can be induced by proximity or contact of the object, wherein sensor management provides a mean for acquiring and measuring absolute or relative voltage value at each sensing point wherein charge transfer capacitance measurement circuit is used to translate the electrical charge information into local position information.

2. The system of claim 1, wherein the treating of a sensing image consists of a group of treatments selected from collecting, processing, publishing and enhancing the sensing image.

3. The system of claim 2, wherein the sensors are synchronized with similar signal distributed to other sensing tiles.

4. The system of claim 2, wherein the system further includes a parameter management module adapted for parameter modifications and signal persistence.

5. The system of claim 2, wherein the tile controller comprises a capacitive sensor, an analog-to-digital conveter means for converting analog signal to digital signal, a digital logic means and a control means for generating digital control signals.

6. The system of claim 2 wherein the object is moving.

7. The system of claim 2 wherein the sensors are affixed on a substrate of dielectric material that is relatively thin for a relatively large surface area.

8. The system of claim 5 wherein the substrate is flexible.

9. The system of claim 2 wherein the sensors are composed of a pair number of conductor elements.

10. The system of claim 2 wherein the sensors are printed circuits.

11. The system of claim 2 wherein the sensor is printed by lithographic process over one substrate material.

12. The system of claim 2 wherein the substrate is made of a thin polymer material.

13. The system of claim 2 wherein the conductor elements are shielded by a dielectric material.

14. The system of claim 2 wherein the sensing tiles comprises a variable density of sensing points from one area of the sensing tile to another, providing variable resolution within a single sensing file.

15. The system of claim 2 wherein the sensing tiles are arranged spaced apart one from one other.

16. The system of claim 2 wherein the sensing tiles are installed on top of a surface such as a floor, a wall or a furniture.

17. The system of claim 2 wherein the sensing tiles are installed underneath a surface such as a floor, a wall or a furniture.

18. The system of claim 2 wherein the sensing tiles are integrated in between two layers of a surface such as a floor, a wall or a furniture.

19. The system of claim 2 wherein a protective layer composed of insulating material selected from a group of insulating material including foam, polymer, and rubber, is disposed immediately on top of the sensing tile, and covered by a rigid top layer for ensuring durability and facilitating displacement of persons and objects.

20. The system of claim 2 wherein a grounded plate composed of conducting material is arranged between the surface cover and the sensing tiles in order to shield the sensing tiles and provide immunity to vibrations and electrostatic interferences originating from movement underneath or in contact with the surface cover, wherein further, shielding extends to all sensing points to avoid unexpected signal noise and helps to collect accurate position sensing in demanding contexts such as a moving deck.

21. The system of claim 2 wherein the object comprises an electrically conductive element.

22. The system of claim 2 wherein the tile controller comprises logic circuit elements for processing logical computing processes to reduce signal noise.

23. The system of claim 2 wherein the sub-group controller is adapted for routing command traffic and for collecting, processing and publishing a sensing image.

24. The system of claim 2 wherein the central computer routes geographic positioning information to a media control system adapted for real-time video editing or real time rendering of computer-generated graphics.

25. The system of claim 2 having a modular construction wherein sensing tiles are constructed as independent sensing units for charge transfer sensing means.

26. The system of claim 2 wherein the system features a multiple sub-controllers configuration comprising, a group controller adapted for routing command traffic and for collecting, processing and publishing the sensing images generated by the plurality of sub-group controllers, comprising digital logic means equivalent in functionality to digital logic means of sub-group controllers, such as microprocessors able to read and execute instructions, which are adapted for operations such as the acquisition process, the cropping and translation process, low level filtering, parameter management, broadcast management, command management operations, and network management;

power and clock controllers adapted for distributing electrical power to the group controller and to the subgroup controller, and for providing a synchronization signal through sub-group controller;

a communication system for remotely transmitting the position information signal from the sensing tiles to the sub-group controller, and from the sub-group controller to the central controller, and for remotely controlling the capacitance measurement circuit and the sub-group controller; and a central controller for receiving the sensing image provided by the sensing surface and for controlling the group controller and the capacitance measurement circuits wherein group controller publishes to the central controller the position information in view of all the sensing tiles connected through the sub-group controllers, to form a single coherent sensing surface, and wherein software-based logical computing processes (filters) are used to reduce noise and to enhance the sensing image at the sub-group controller level and at the group controller.

27. The system of claim 2, further adapted for collecting information on the geographic position of a plurality of objects simultaneously.

28. A tracking system for use on a large surface area such as a theatre stage, comprising at least two sensing tiles sensitive to changes in self-capacitance brought about by changes in the geographic position of an object relative to the sensing tile, the sensing tile comprising at least two conductor elements, a sensor for measuring the capacitance to ground of the conductor element, a capacitance measurement circuit adapted for measuring electrical charge, voltage and for converting the sensor voltage data into position information, and data communication means; a sub-group controller for distributing electrical power to the sensing tiles, for synchronizing the position information signal received from all sensing tiles connected therewith and for routing command traffic, comprising logic circuit elements for processing logical computing processes, and data communication means; a communication system for remotely transmitting the position information signal from the sensing tiles to the sub-group controller, and from the sub-group controller to the central controller, and for remotely controlling the capacitance measurement circuit and the sub-group controller; and a central controller for receiving the sensing image from the sub-group controller and for controlling the sub-group controller and the capacitance measurement circuits, wherein sensor digital signal from the sensing surface is optionally refreshed several times a second, allowing positions to be captured accurately at a displacement speed over the surface of thirty km/h or more for several simultaneous objects, and wherein the system collects information on the geographic position of objects at all time, and can optionally retain in memory position information according to time, in order to detect and interpret movement paths and consequently, determine positioning and movement attributes including displacement speed, direction of displacement, and acceleration.

29. Method for data input for use by a media control system, the method comprising the following steps:

acquiring and measuring absolute or relative voltage value at each of at least one sensing point located on the surface of a sensing tile using sensor management means, translating electrical charge information into sensing signals using a transfer capacitance measurement circuit, receiving sensing signals on not-necessarily adjacent tiles such signals including signals representative of position, speed, and direction of displacement, combining the sensor digital signals originating from the at least two not-necessarily adjacent sensing tiles into a coherent sensing image signal;

reading and using the combined signal to orchestrate lighting, or music or other devices for media control and the creation of digital imagery.

* * * * *

UNITED STATES PATENT AND TRADEMARK OFFICE
CERTIFICATE OF CORRECTION

PATENT NO. : 7,315,793 B2
APPLICATION NO. : 11/213313
DATED : January 1, 2008
INVENTOR(S) : Philippe Jean It is certified that error appears in the above-identified patent and that said Letters Patent is hereby corrected as shown below:

Col. 1, line 29, replace the phrase "Another set back or these" with --Another set back of these--.

Col. 2, line 22, replace the phrase "devices that can be used" with --devices that can be used--.

Col. 3, line 53, replace the phrase "tiles typically carries" with --tiles typically carry--.

Col. 7, line 15, replace the phrase "can be a cut and" with --can be cut and--.

Col. 7, line 34, replace the phrase "sent to or retrieves" with --sent to or retrieved--.

Col. 8, line 36, replace the phrase "material, expect in places" with --material, except in places--.

Col. 8, line 40, replace the phrase "a rigid top payer 56" with --a rigid top layer 56--.

Col. 8, line 47, replace the phrase "activity tacking place" with --activity taking place--.

Col. 11, line 55, replace the phrase "analog-to-digital conveter" with --analog-to-digital converter--.

Col. 12, line 10, replace the phrase "within a single sensing file" with --within a single sensing tile--.

UNITED STATES PATENT AND TRADEMARK OFFICE
CERTIFICATE OF CORRECTION

PATENT NO. : 7,315,793 B2
APPLICATION NO. : 11/213313
DATED : January 1, 2008
INVENTOR(S) : Philippe Jean It is certified that error appears in the above-identified patent and that said Letters Patent is hereby corrected as shown below:

Col. 13, line 31, replace the phrase, "electrical charge, voltage" with --electrical charge voltage--.

Signed and Sealed this

Twentieth Day of May, 2008

JON W. DUDAS
*Director of the United States Patent and Trademark Office*